US006279886B1

(12) United States Patent
Grossart

(10) Patent No.: US 6,279,886 B1
(45) Date of Patent: Aug. 28, 2001

(54) POWER CLAMPS

(75) Inventor: Peter Simpson Kirkwood Grossart, Braunston (GB)

(73) Assignee: HMC Brauer Limited, Milton Keynes (GB)

( * ) Notice: Subject to any disclaimer, the term of this patent is extended or adjusted under 35 U.S.C. 154(b) by 0 days.

(21) Appl. No.: 09/488,176

(22) Filed: Jan. 20, 2000

(30) Foreign Application Priority Data

Nov. 26, 1999 (GB) .................................................. 9928038

(51) Int. Cl.[7] ........................................................ B23G 3/08

(52) U.S. Cl. .................................. 269/24; 269/32; 269/52

(58) Field of Search .................................. 269/32, 20, 24, 269/27, 201, 228, 229

(56) References Cited

U.S. PATENT DOCUMENTS 4,458,889 7/1984 McPherson et al. .
4,620,696 * 11/1986 Blatt ........................................ 269/52
4,905,973 * 3/1990 Blatt ........................................ 269/32
5,460,358 * 10/1995 Sendoykes .............................. 269/32
5,704,600 * 1/1998 Robinson ................................ 269/32
5,998,984 * 12/1999 Takahashi .............................. 269/32
6,079,896 * 6/2000 Dellach .................................. 269/32

* cited by examiner

*Primary Examiner*—Joseph J. Hail, III
*Assistant Examiner*—Daniel Shanley
(74) *Attorney, Agent, or Firm*—Merchant & Gould P.C.

(57) ABSTRACT

A power clamp includes a body member (2), an arm member (14) connected to the body member by means of a pivot joint (16) to allow pivoting movement of the arm member between an open position and a closed position, an actuator (10), a first drive mechanism (42) connecting the actuator (10) to the arm member (14) to control movement thereof, and a second drive mechanism (20,28) connecting the actuator (10) to the arm member (14) to apply a clamping force to the arm member when the arm member is in a closed position.

11 Claims, 7 Drawing Sheets

POWER CLAMPS

The present invention relates to a power clamp and in particular, but not exclusively, to a pneumatically- or hydraulically-operated power clamp.

Air-powered power clamps have for many years employed a pneumatically-driven drive rod that is connected to a pivoting clamping arm by a pivot link. As the drive rod is actuated, the clamping arm is driven through the pivot link, which causes the arm to rotate about its pivot joint with the clamp body to a closed position and then applies a clamping load. The pivot link may be driven to a centred or over-centre position, to lock the clamp. An example of such a clamp is illustrated in U.S. Pat. No. 4,458,889.

One disadvantage of clamps of the general type described above is that the force required to release the clamp is generally higher than the clamping force, owing to the high static friction forces that must be overcome to effect release. This is particularly true when the clamp is locked in an over-centre condition, since an additional force must be applied to bring the clamp back to a centred positioned before it can be released.

This difficulty is further compounded by the fact that the release force that can be applied by a pneumatically-operated drive rod is generally less than the applying force, owing to the fact that the pneumatic piston has a smaller effective area on the release side than it has on the applying side, owing to the presence on that side of the drive rod.

As a result of the foregoing, it is generally necessary to arrange the clamp so that the applied clamping force is always significantly less than the potential maximum force with the available air pressure, so that there is sufficient air pressure to release the clamp. Alternatively, the clamp may be arranged so that a centred or over-centre condition is never reached, so that the clamp is never locked in the clamped condition. However, this is not acceptable for all situations, as sometimes it is necessary to provide a self-servo locking clamp (i.e. a clamp that remains locked even after the air pressure has been removed).

It is an object of the present invention to provide a power clamp that mitigates at least some of the aforesaid disadvantages.

According to the present invention there is provided a power clamp including a body member, an arm member connected to the body member by means of a pivot joint to allow pivoting movement of the arm member between an open position and a closed position, an actuator, a first drive mechanism connecting the actuator to the arm member to control movement thereof, and a second drive mechanism connecting the actuator to the arm member to apply a clamping force to the arm member when the arm member is in a closed position.

Advantageously, said first drive mechanism and said second drive mechanism are arranged to operate sequentially when the actuator is actuated.

Advantageously, said first drive mechanism includes a lost motion mechanism, to allow limited movement of the actuator when the arm member is in a closed position without causing significant movement of the arm member.

Advantageously, the second drive mechanism includes a cam device for applying a clamping force to the arm member. The cam device may be arranged for linear movement. The cam device may be arranged for movement with the actuator. The second drive mechanism may include a roller that engages the cam device. The cam device may have a cam surface that includes a first portion of positive gradient and a second portion of zero or negative gradient.

Advantageously, the actuator includes a drive rod that is arranged for longitudinal reciprocating movement. Preferably, the pivot joint has a pivot axis that is substantially perpendicular to the longitudinal axis of the drive rod.

Advantageously, the actuator is hydraulically- or pneumatically-actuated.

Embodiments of the invention will now be described with reference to the accompanying drawings, in which.

Figure 1:
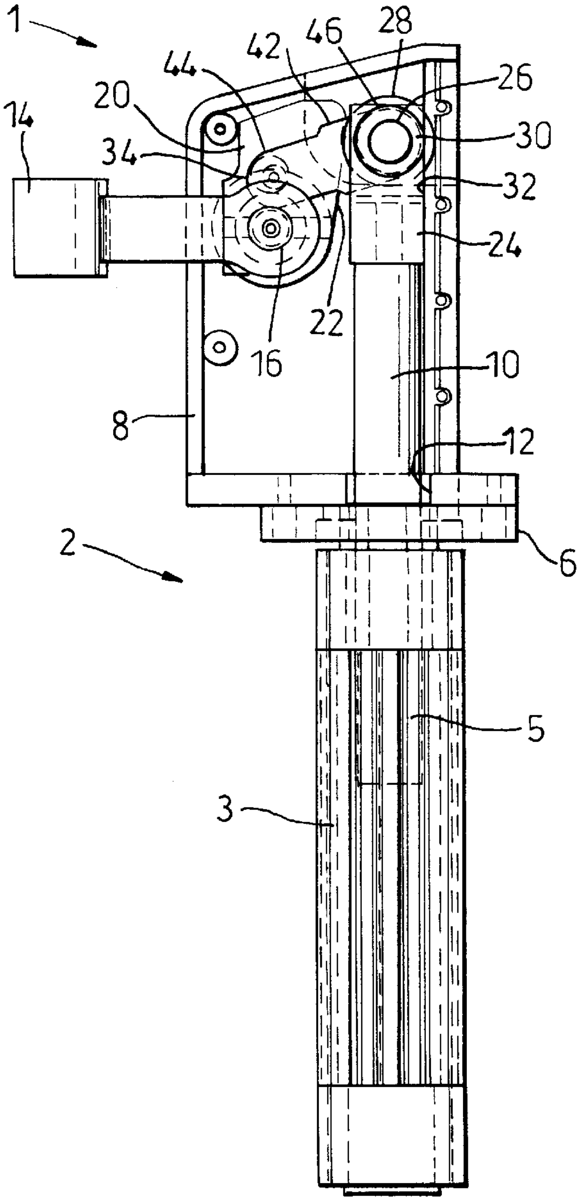
FIG. 1 is a side view of a first power clamp according to the invention, with part of the clamp housing removed.
Figure 2:
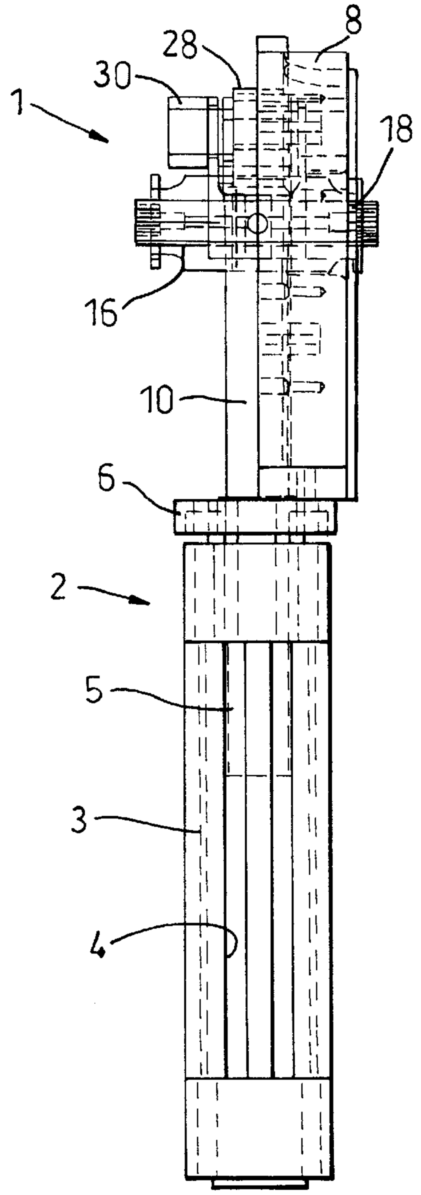
FIG. 2 is a front view of the first clamp.
Figure 3:
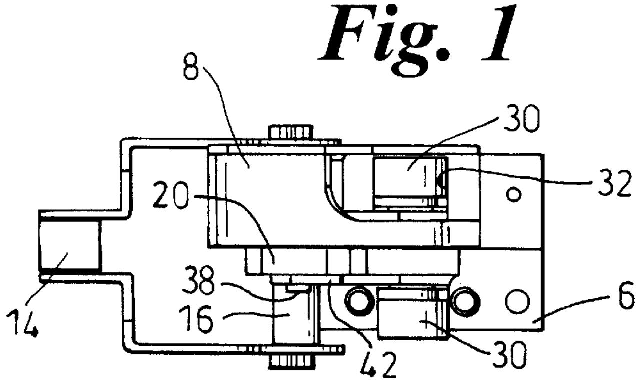
FIG. 3 is a top view of the first clamp.
Figure 4:
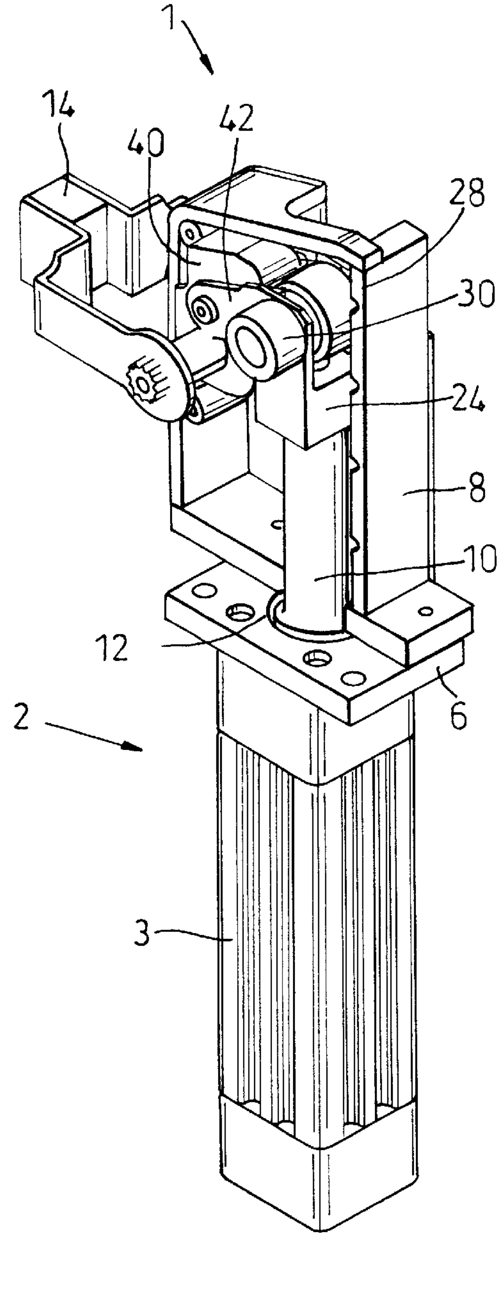
FIG. 4 is a perspective view of the first clamp.
Figure 5:
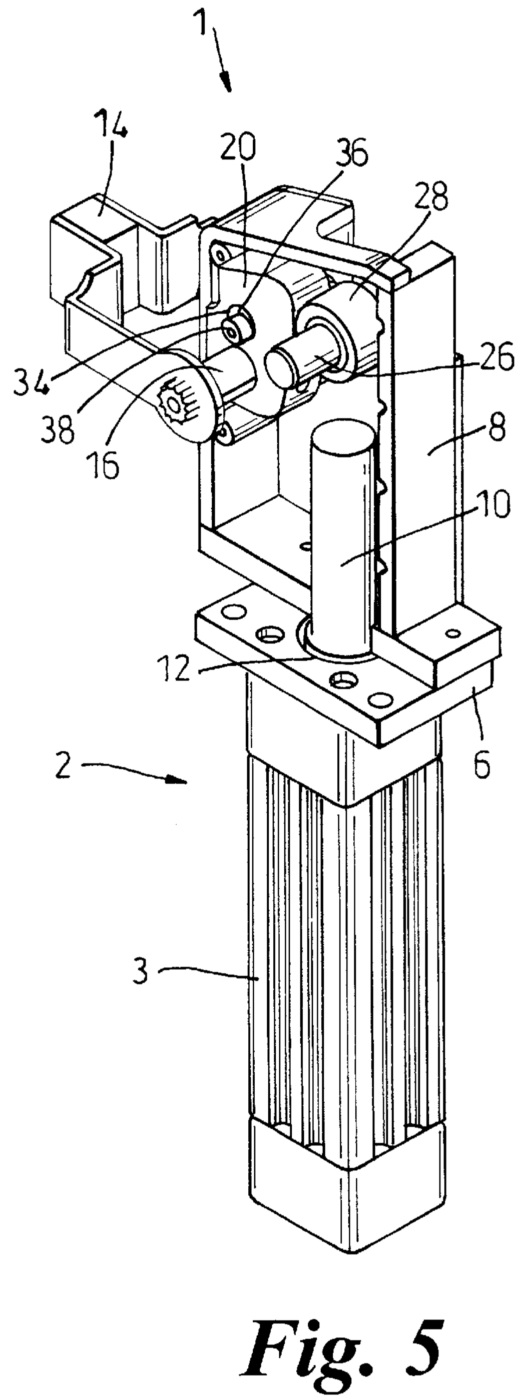
FIG. 5 is a perspective view of the first clamp, with part of the link mechanism removed.

The first power clamp 1 shown in FIGS. 1 to 5 includes a clamp body 2 having an elongate square section lower body portion 3 that contains a pneumatic actuator. A circular bore 4 extends longitudinally through the lower body portion 3, in which is mounted a pneumatically actuated piston 5. Attached to the upper end of the lower body portion by means of a flange 6 is a housing 8 that is formed in two halves, only one of which is shown in the drawings so as to reveal the internal components of the housing.

A cylindrical drive rod 10 that is connected at its lower end to the piston 5 extends through the bore 4 and into the housing 8 through an aperture 12. The drive rod 10 is mounted for reciprocating movement in the direction of its longitudinal axis, under the control of the pneumatic actuator.

A clamping arm (or lever) 14, only part of which is shown, is mounted on an arm axle 16 that extends through complementary apertures 18 on each side of the housing 8. The arm 14 can rotate clockwise on the axle 16 from the position shown in the drawings (the clamping position) through an angle of approximately 120° to an open position (not shown).

Mounted on the central part of the arm axle 16, within the housing 8, is a cam plate 20. The cam plate 20 and the arm 14 are both permanently fixed to the arm axle 16 for rotation therewith relative to the housing 8. The cam plate 20 has a profiled cam surface 22 that faces towards the upper end of the drive rod 10.

Attached to the upper end of the drive rod 10 is a U-shaped bracket 24 that supports a short roller axle 26. Mounted on the central part of the roller axle 26 is a cam roller 28 that, in use, engages the profiled cam surface 22 of the cam plate 20. The two ends of the roller axle 26, which extend outwards on each side of the bracket 24, each support a guide roller 30 that engages the rear wall 32 of the housing 8 to support the upper end of the drive rod 10 and hold the cam roller 28 in engagement with the profiled cam surface 22.

A circular bore 34 extends transversely through the cam plate 20 at a position that is radially displaced from the pivot axle 16. Mounted in this bore is a short cylindrical shaft 36 that supports at each end an eccentrically-mounted stub axle 38, which extends beyond the side face 40 of the cam plate 20.

On each side of the cam plate 20 there is provided a pivot link 42, a first end 44 of which is connected to the eccentric stub axle 38 and a second end 46 of which is rotatably secured around the roller axle 26, mounted at the upper end of the drive rod 10. The eccentric position of the stub axle 38 enables the shaft 36 to act as a lost motion mechanism, providing a degree of free play in the connection from the drive rod 10 to the cam plate 20 via the pivot link 42.

In operation, the position of the clamping arm 14 is determined by the longitudinal position of the drive rod 10. When the upper end of the drive rod 10 is located towards the upper end of the housing (as shown in the drawings), the arm will be in the closed or clamped position. When the drive rod 10 moves downwards, the arm 14 will rotate clockwise with the arm axle 16 to an open position, by virtue of the arm's connection to the drive rod 10 through the pivot links 42. As the drive rod moves back upwards, the arm 14 will rotate anti-clockwise and will return from the open position to the closed position. However, even after the arm 14 has returned completely to the closed position, some further movement of the drive rod will still be possible without causing further movement the arm 14, owing to the provision of a lost motion mechanism in the connection from the drive rod 10 to the arm 14 through the pivot links 42.

The cam roller 28 engages the cam surface 22 of the cam plate 20 only when the drive rod 10 is located towards the upper end of the housing 8 (as shown in the drawings), i.e. when the arm 14 is in a closed position. When the drive rod 10 moves downwards causing the arm 14 to rotate to the open position, the cam roller 28 moves out of engagement with the cam 20, leaving a gap between the cam roller and the cam surface 22.

When the cam roller 28 engages the cam surface 22 of the cam plate 20, it applies a clamping force to the cam, which is transmitted through the arm axle 16 to the clamping arm 14. The magnitude of this clamping force depends on the profile of the cam surface 22 and the position of the cam roller 28 relative to the cam 20, and increases as the drive rod 10 is driven upwards. Therefore, as the drive rod 10 is driven upwards from its lowest position, the arm 14 is first brought into the closed position through the action of the pivot links 42 and a clamping force is then applied as the cam roller 28 engages the cam 20.

The profile of the cam surface 22 is selected to provide the desired clamping force characteristics. In the example shown in the drawings, the profile has a positive gradient and produces a clamping force that increases continuously to a maximum value as the drive rod 10 is driven upwards.

Alternatively, the profile may include a first portion that has a positive gradient and produces an increasing clamping force, and a second portion of zero gradient that produces a constant clamping force. This results in a clamping characteristic that is equivalent to the "centred" position of a conventional power clamp, and allows the clamp to remain locked without maintaining a force on to the drive rod.

As another alternative, the profile may include a first portion with a positive gradient that produces an increasing clamping force, and a second portion with a slight negative gradient that produces a decreasing clamping force. This will produce a clamping characteristic that is equivalent to the "over-centre" position of a conventional power clamp, which prevents the clamp becoming unlocked (for example, due to vibrations) without applying a significant downwards force to the drive rod. By making the gradient of the second portion smaller than that of the first portion, the clamp can be arranged such that the force required to release the clamp is less than the applying force, thereby ensuring that the clamp can be released even in the case that the pneumatic actuator is unable to provide an equal force on both strokes.

As yet another alternative, the profile may include a first portion with a positive gradient that produces an increasing clamping force, a second portion of zero gradient that produces a constant clamping force, and a third portion with a slight negative gradient that produces a decreasing clamping force.

A second embodiment of the clamp is shown schematically in FIGS. 6 to 12. Only the upper part of the clamp is shown, it being understood that the clamp also includes a lower body portion similar to that of the first clamp, but not shown in the drawings. Attached to the upper end of the lower portion is a housing 50.

A cylindrical drive rod 52 that, in use, is connected to a pneumatic or hydraulic actuator (not shown) extends upwards into the housing 50. The drive rod 52 is mounted for reciprocating movement in the direction of its longitudinal axis, under the control of the pneumatic or hydraulic actuator.

A clamping arm (or lever) 54, only part of which is shown, is mounted on an arm axle 56 that extends through complementary apertures 58 on each side of the housing 50. The arm 54 can rotate clockwise on the axle 56 from the closed position shown in FIG. 6 (which is the clamping position) through the various intermediate positions shown in FIGS. 7–11 to the fully open position shown in FIG. 12.

The inner end of the arm 54, which is located within the housing 50, is shaped to provide a side arm 60 having a bearing surface 62 that extends substantially perpendicular to the axis of the arm 54. A cam roller 64, which is loosely secured to the side arm 54 by means of a sprung support arm 66, is arranged to bear against the bearing surface 62. Some free play is provided in the connection between the roller 64 and the support arm 66 to allow the roller 64 to roll up and down against the bearing surface 62.

Figure 6:
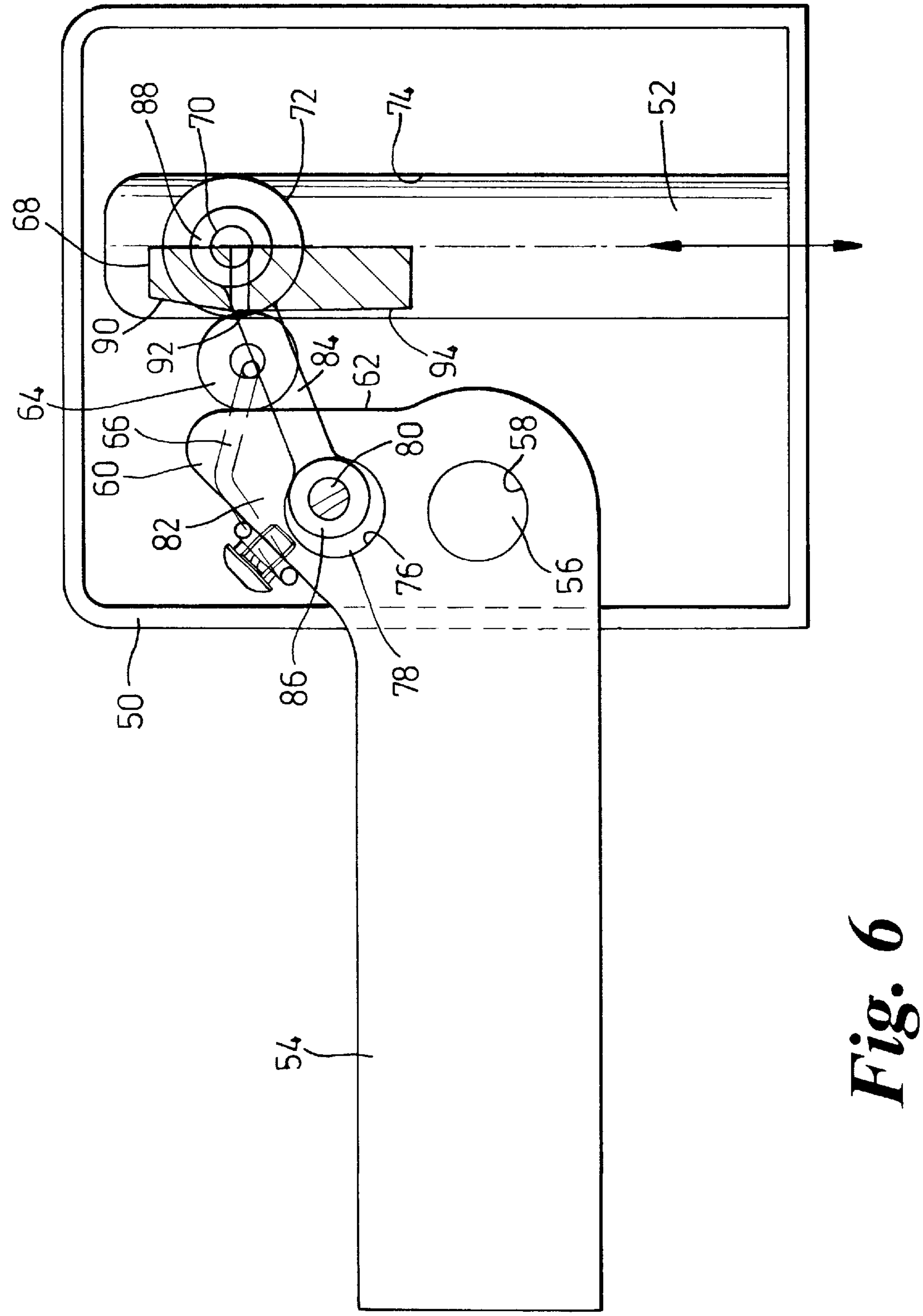
FIG. 6 is a schematic side view of a second power clamp according to the invention, showing the clamp in a closed and locked condition.
Figure 7:
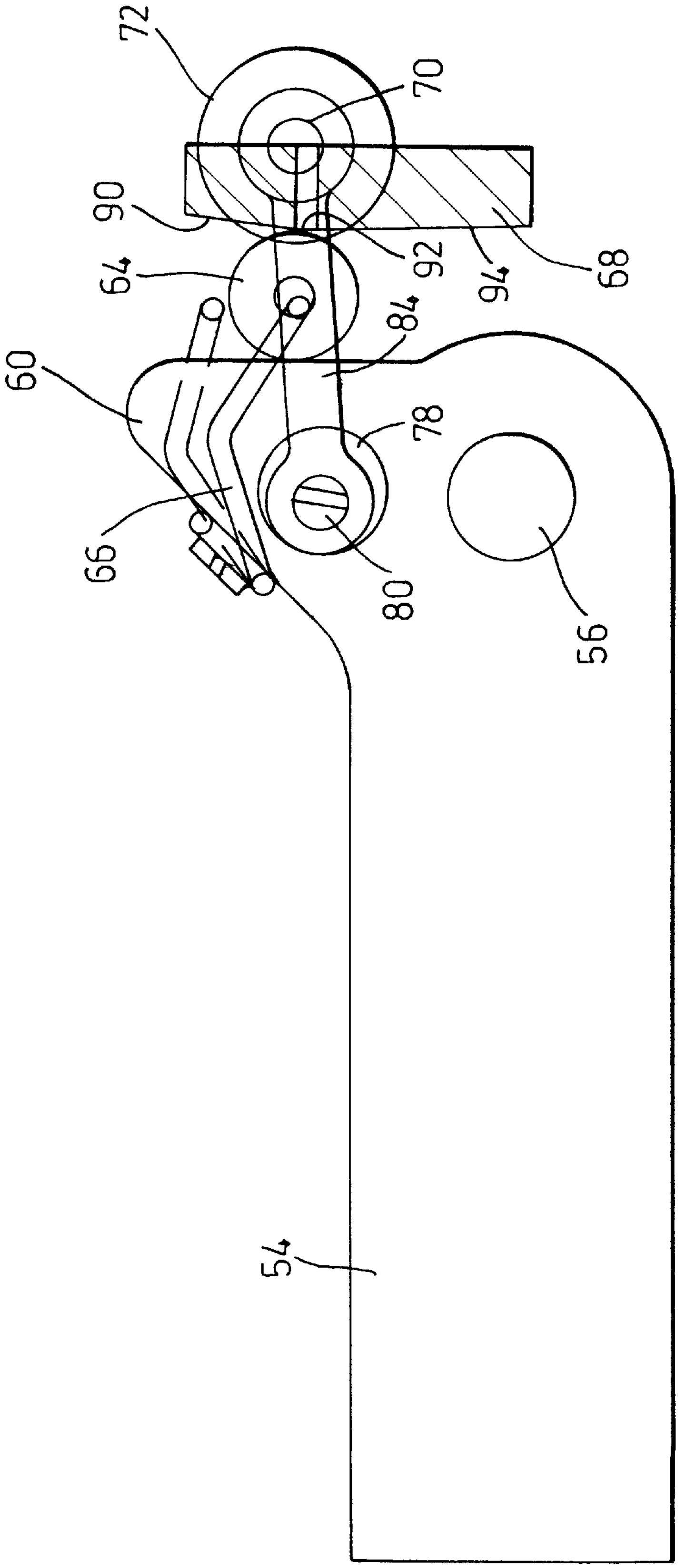
FIGS. 7 to 12 are schematic side views of the second power clamp, showing the clamp in a sequence of positions as it moves to an unclamped and open condition.
Figure 8:
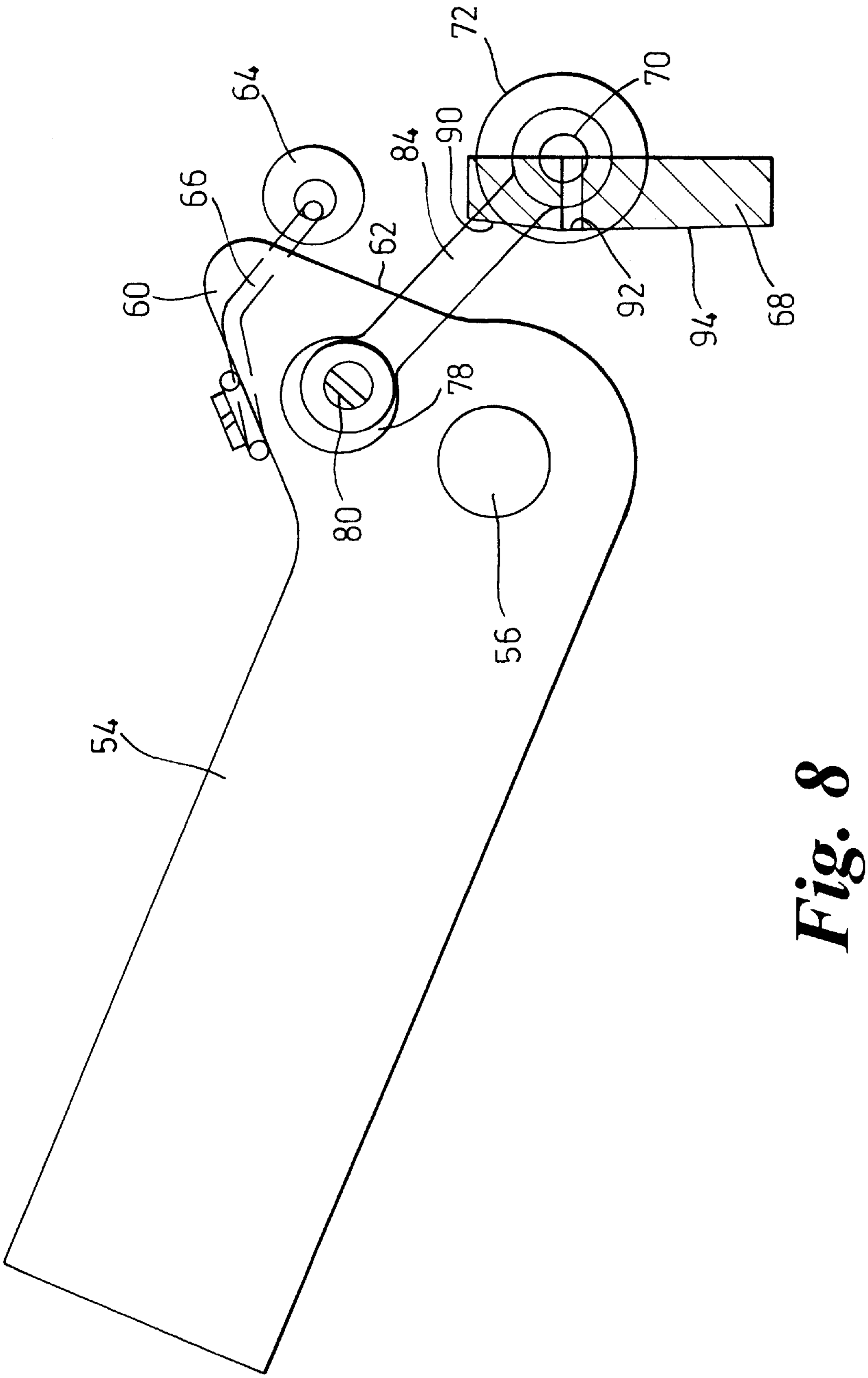
Figure 9:
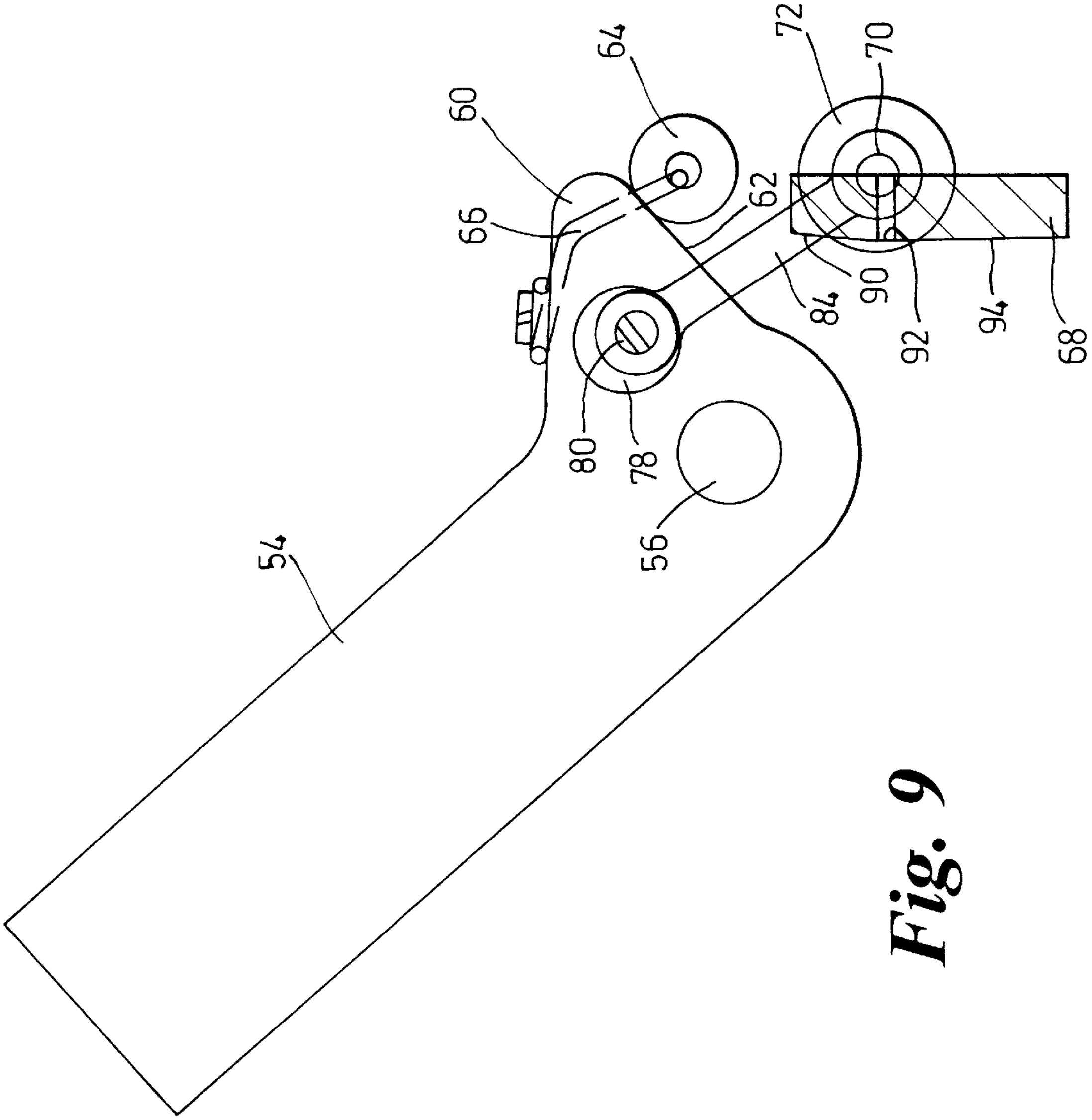
Figure 12:
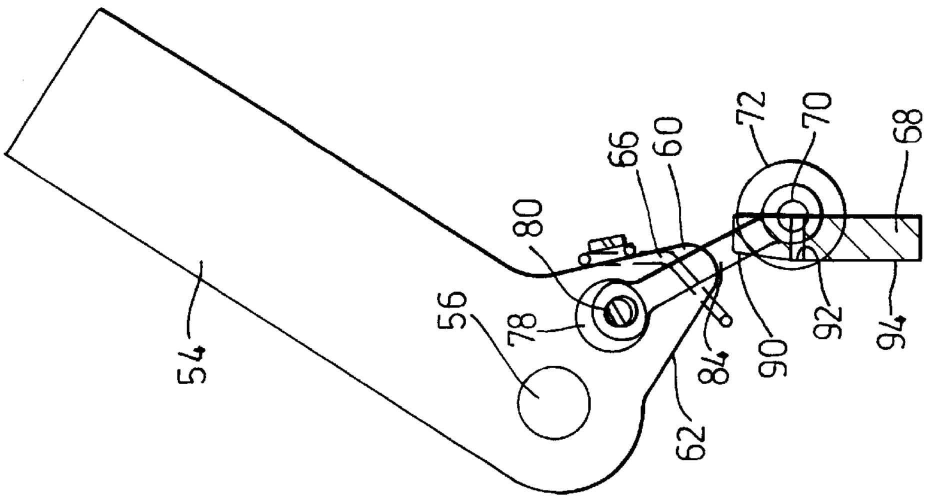
Figure 11:
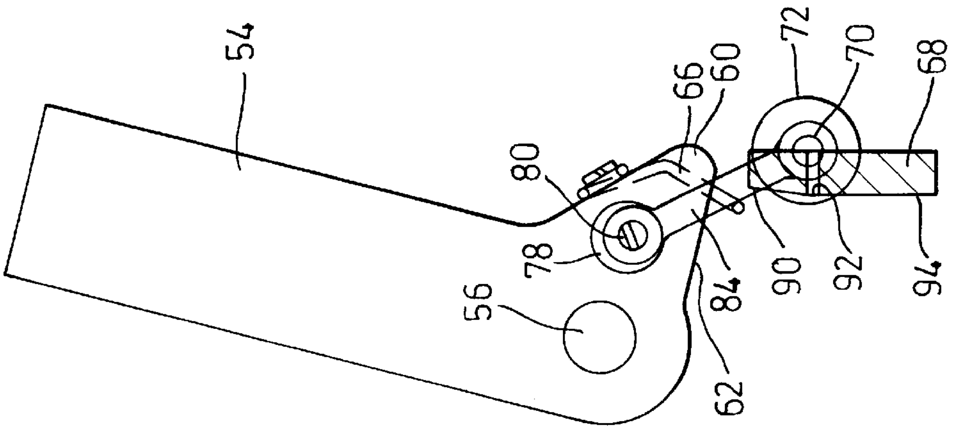
Figure 10:
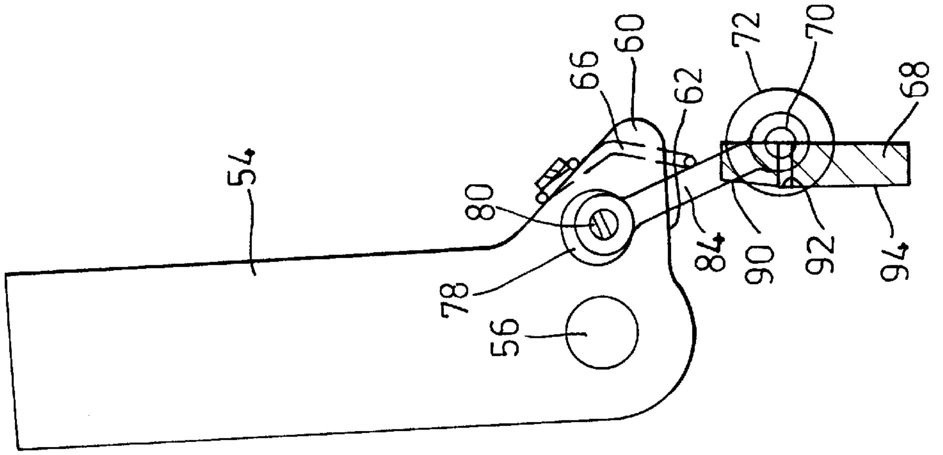

At the upper end of the drive rod 52 there is provided a profiled cam surface 68 that engages the cam roller 64 when the drive rod is in a raised position, as shown in FIGS. 6 and 7. When the drive rod 52 is lowered as shown in FIGS. 8–12, the cam surface 68 loses engagement with the cam roller 64.

The upper end of the drive rod 52 also supports a short roller axle 70. The ends of the roller axle 70, which extend outwards on each side of the drive rod 52, each support a guide roller 72 that engages a guide slot 74 provided in the side of the housing 50 to support the upper end of the drive rod 52 and hold the cam roller 64 in engagement with the bearing surface 62.

A circular bore 76 extends transversely through the side arm 60 at a position that is radially displaced from the pivot axle 56. Mounted in this bore is a short cylindrical shaft 78 that supports at each end an eccentrically-mounted stub axle 80, which extends beyond the side face 82 of the side arm 60.

On each side of the side arm 60 there is provided a pivot link 84, a first end 86 of which is connected to the eccentric stub axle 80 and a second end 88 of which is rotatably secured around the roller axle 70, mounted at the upper end of the drive rod 52. The eccentric position of the stub axle 80 enables it to act as a lost motion mechanism, providing for a degree of free play in the connection via the pivot link 84 from the drive rod 52 to the side arm 60.

In operation, the position of the clamping arm 54 is determined by the longitudinal position of the drive rod 52. When the upper end of the drive rod 52 is located towards the upper end of the housing (as shown in FIGS. 6 & 7), the arm will be in the closed position. When the drive rod 52 moves downwards, the arm 54 will rotate clockwise to the open position as shown in FIGS. 8–12 by virtue of the arm's connection to the drive rod 52 through the pivot links 84. As the drive rod moves back upwards, the arm 54 will rotate anti-clockwise and will return from the open position to the closed position.

Even after the arm 54 has returned completely to the closed position, some further movement of the drive rod 52 is still possible without causing a significant movement of the arm 54, owing to the provision of a lost motion mechanism in the connection from the drive rod 52 to the arm 54 through the pivot links 84.

The cam roller 64 engages the cam surface 68 only when the drive rod 52 is located towards the upper end of the housing 50 (as shown in FIGS. 6 & 7), when the arm 54 is in the closed position. When the drive rod 52 moves downwards causing the arm 54 to rotate to the open position, the cam roller 64 moves out of engagement with the cam surface 68, leaving a gap between the cam roller and the cam surface.

When the cam roller 64 engages the cam surface 68, it applies a clamping force to the arm 54. The magnitude of this clamping force depends on the profile of the cam surface 68 and the position of the cam roller 64 relative to the cam surface, and increases as the drive rod 52 is driven upwards. Therefore, as the drive rod 52 is driven upwards from its lowest position, the arm 15 is first brought into the closed position through the action of the pivot links 84 and a clamping force is then applied through the interaction of the cam surface 68 and the cam roller 64.

The profile of the cam surface 68 is selected to provide the desired clamping force characteristics. In the example shown in FIGS. 6–12, the profile has a first portion 90 with a positive gradient that produces an increasing clamping force, a second portion 92 of zero gradient that produces a constant clamping force, and a third portion 94 with a slight negative gradient that produces a decreasing clamping force. In FIG. 6, the cam roller 64 is shown in engagement with the second portion 92 of the cam surface 68, and the clamp is therefore clamped and locked and will remain clamped even if the air pressure at the actuator is lost, but can be released by applying a relatively small release pressure to the actuator. If the drive rod 52 were positioned a little higher, the cam roller 64 would engage the third portion 94 of the cam surface 68 and the clamp would then be clamped and servo-locked. It would then remain clamped if the air pressure at the actuator were lost and would resist any tendency to become unlocked even if subjected to severe shocks or vibrations.

In FIG. 7, the cam roller 64 is shown in engagement with the cam surface 68 at the transition between the first portion 90 and the intermediate portion 92, and the clamp is therefore clamped but on the verge of being released.

Various alternative profiles are of course possible, as described above in relation to the first clamp.

Various modifications of the clamps described above are possible, some examples of which will now be described. The first drive mechanism for opening and closing the clamp may include a pivot link as shown in the drawings or alternatively it may employ some other mechanism, for example a profiled slot or a rack and pinion. Further, the lost motion mechanism in the first drive mechanism may take various different forms: for example, the mechanism may include an eccentric, a slotted or resilient pivot link, a resilient bush or a combination of these devices.

The second drive mechanism for applying a clamping force to the arm may include a cam or a wedge as described above, or alternatively another device may be used that provides the required clamping characteristics including, where necessary, the possibility of a self-servo lock. Where a profile is used this is preferably constrained to move in a straight line, the driving force being provided by an air or hydraulic cylinder.

The proposed intermediate roller can be used as shown in the drawings or alternatively it may be mounted in a carrier for movement essentially in unison with the cam, but with the capability of independent movement as required by the need to allow the cam a degree of extra travel to reach its locked position.

The actuator may be pneumatically- or hydraulically-operated or, alternatively, an electrical or mechanical actuator may be used.

What is claimed is:

1. A power clamp comprising:

a body member, a rigid clamping arm connected to the body member by means of a pivot joint to allow pivoting movement of the clamping arm between an open position and a closed position, said pivot joint being mounted in a fixed position relative to the body member;

an actuator mounted in said body member for substantially rectilinear reciprocating movement relative thereto;

a first drive mechanism connecting the actuator to the clamping arm to control movement thereof, said first drive mechanism being constructed and arranged to convert linear motion of the actuator into rotational movement of the clamping arm about said pivot joint between an open position and a closed position; and a second drive mechanism comprising a first drive element that is associated with the clamping arm and a second drive element that is associated with the actuator, said second drive mechanism being constructed and arranged such that when said clamping arm is in the closed position, said second drive element engages said first drive element to apply a clamping force to the clamping arm.

2. The power clamp of claim 1, wherein the first drive mechanism and the second drive mechanism are constructed and arranged to operate sequentially when the actuator is actuated.

3. The power clamp of claim 1, wherein the first drive mechanism further comprises a lost motion mechanism that is constructed and arranged to allow limited movement of the actuator when the arm member is in the closed position without causing significant movement of the clamping arm.

4. The power clamp of claim 1, wherein the second drive mechanism further comprises a cam device that is constructed and arranged for applying a clamping force to the clamping arm.

5. The power clamp of claim 4, wherein the cam device is constructed and arranged for linear movement.

6. The power clamp of claim 5, wherein the cam device is constructed and arranged for movement with the actuator.

7. The power clamp of claim 4, wherein the second drive mechanism further comprises a roller that is constructed and arranged to engage the cam device.

8. The power clamp of claim 4, wherein the cam device has a cam surface that comprises a first portion of positive gradient and a second portion of zero or negative gradient.

9. The power clamp of claim 1, wherein the actuator comprises a drive rod that is constructed and arranged for longitudinal reciprocating movement.

10. The power clamp of claim 9, wherein the pivot joint has a pivot axis that is substantially perpendicular to a longitudinal axis of the drive rod.

11. The power clamp of claim 1, wherein the actuator is either hydraulically activated or pneumatically actuated.

* * * * *